United States Patent [19]

Straayer et al.

[11] Patent Number: 4,867,566

[45] Date of Patent: Sep. 19, 1989

[54] METHOD AND APPARATUS FOR CALIBRATING ARTWORK FROM A DIRECT IMAGING SYSTEM

[75] Inventors: Ronald J. Straayer, South Windsor, Conn.; Raymond E. Timmons, Jr., Simpsonville, S.C.

[73] Assignee: The Gerber Scientific Instrument Company, South Windsor, Conn.

[21] Appl. No.: 164,519

[22] Filed: Mar. 7, 1988

[51] Int. Cl.$^4$ ............................................. G01B 11/00
[52] U.S. Cl. ..................................... 356/372; 356/243
[58] Field of Search ................................. 356/372, 243

[56] References Cited

U.S. PATENT DOCUMENTS 4,639,142  1/1987  Chow et al. ...................... 356/372

Primary Examiner—Vincent P. McGraw
Assistant Examiner—S. A. Turner
Attorney, Agent, or Firm—McCormick, Paulding & Huber

[57] ABSTRACT

A novel method and apparatus for determining the accuracy of artwork produced from a laser direct imaging system employs a calibration substrate which has images of opposed, perpendicular scales and registration marks thereon. The overall system dimensional error is determined directly from substrate measurements, as is the magnitude of the mechanical and processing errors.

4 Claims, 2 Drawing Sheets

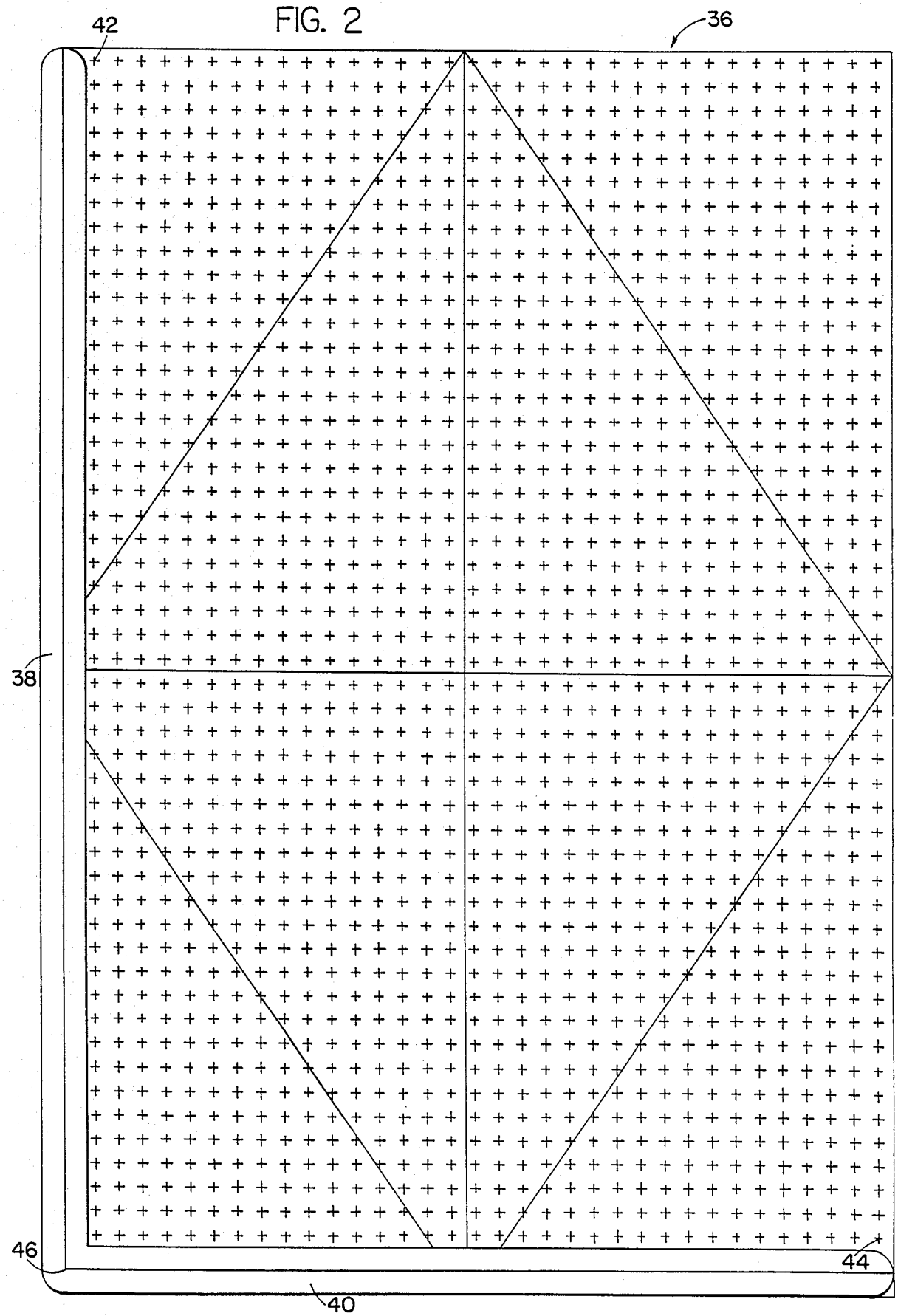

METHOD AND APPARATUS FOR CALIBRATING ARTWORK FROM A DIRECT IMAGING SYSTEM

TECHNICAL FIELD

This invention relates to systems for calibrating optically produced artwork for dimensional accuracy and more particularly, to a method and apparatus used in calibrating printed circuit board artwork produced with a direct optical imaging system.

BACKGROUND OF THE INVENTION

High speed optical scanning systems, such as precision plotters, printers and the like, are well known in the art. These devices are often used to fabricate printed circuit board (PCB) artwork by raster scanning onto film. A typical imaging system, such as is marketed by the Gerber Scientific Instrument Company, consists of a magnetic tape drive, hard disk, computer interactive graphics terminal, image processor, optical table having a moveable write platen for positioning the substrate and a precision laser scanner. The system also includes such other optics, media carriage and electronics as is necessary to directly transfer computer aided design (CAD) data to PCB artwork.

In operation, the direct imaging system is configured to receive on the write platen a planar substrate of film or glass which has an optically sensitive media on a surface. The computer modulates the intensity of an optical beam, usually provided by laser, to expose selected portions of the substrate. Typically, there is a second reference beam nearly colinear with the exposing beam for accurately controlling the position of the exposing or "write" beam on the substrate. A flat-field scanning system is employed to focus the beams to a small spot and to scan the beam simultaneously across a reference mask and the substrate. Precision air bearings are often used to guide the write platen as it is imaged.

Accuracies for these machines are typically plus or minus 0.001 inch or less for the entire field, and plus or minus 0.0002 inch or less for close features. The image traces are often as fine as 0.002 inches. With such extreme tolerances, a major problem has been to establish the dimensional accuracy of the machine. However, calibration of the imaging system alone does not guarantee that the artwork used in the printed circuit board fabrication process has that dimensional accuracy. Each image on the film substrate must be processed to develop the artwork image. During processing, which includes immersion in a variety of chemicals, the film substrate will expand and contract. Existing techniques for determining the dimensional accuracy of PCB artwork produced on a substrate require estimating the amount of shrinkage or expansion which has occurred during processing and extrapolating the accuracy of the artwork from that estimate.

It would be advantageous to have a method and apparatus for calibrating artwork produced by a direct imaging system which would determine produced image metrology—both the accuracy of the imaging system and loss of accuracy due to the film. The present invention is directed towards such a method and apparatus.

SUMMARY OF THE INVENTION

An object of the present invention is to provide a method and apparatus for calibrating substrate artwork from a direct imaging system which determines overall system dimensional inaccuracy and which separates mechanical inaccuracies from those induced through substrate processing.

According to the present invention, a method for determining the dimensional accuracy of artwork created on an optically sensitive substrate output from a direct optical imaging system includes the steps of generating a calibration substrate by positioning transparent scales on perpendicular adjacent edges of a planar substrate extending from an origin. The calibration substrate is exposed to laser scanned light to image the glass scales, as well as a plurality of registration marks. The calibration substrate is processed to develop the scale images and registration marks on the substrate. The method also includes the steps of generating a corrected scale measurement value from the glass scale images and corrected plot measurement values from the registration marks. A value of calculated system accuracy is computed from the difference between the corrected scale measurement value and the corrected plot measurement value.

BRIEF DESCRIPTION OF THE DRAWINGS

FIG. 2 is a schematic illustration of a calibration substrate produced according to the present invention.

DESCRIPTION OF THE PREFERRED EMBODIMENT

Figure 1:
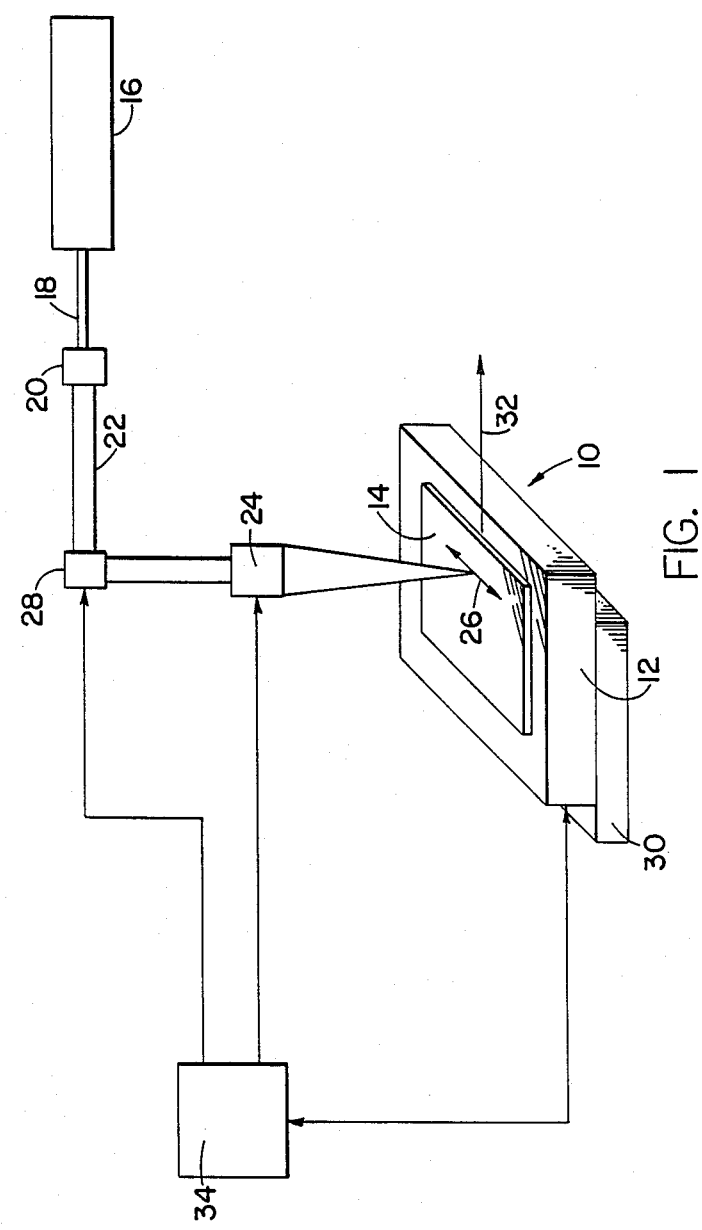
FIG. 1 is a simplified block diagram of a laser direct scanning system employing the present invention.

Referring now to FIG. 1, there is illustrated in simplified schematic form a portion of a laser direct imaging system 10 which includes a write platen 12 that receives a film substrate 14. The substrate is positioned with an optically sensitive media (emulsion) to receive the beam, and is held on the write platen electrostatically or by a vacuum or by another conventional technique. The laser direct imaging system includes a laser 16 which generates a beam 18 that is received by optics 20 which collates or otherwise conventionally configures the beam 18 to output an exposing or "write" beam 20, which exposes the substrate. Scanning mechanism 24 directs the beams along a first direction 26 across the emulsion surface in a focused spot. A shutter 28 selectively exposes the substrate as the beams are rastered across the substrate, while a carriage 30 advances the write platen in a second direction 32 perpendicular to the first in response to signals from controller 34. Controller 34 provides signals to the shutter scanning mechanism and carriage such that the substrate is exposed with the desired pattern.

In the past, the accuracy of conventional vector plotting systems has been determined by a series of direct measurements of the X and Y carriage positions with a laser interferometer. As laser plotters physically do not lend themselves to a similar direct measurement, alternative calibration techniques for artwork are needed. A simple measurement of a plot on a substrate yields a single "accuracy" factor which inseparably combines any machine inaccuracy with errors induced by growth or shrinkage of the substrate during the processing and subsequent drying process, as well as the tolerance of the measuring device itself. However, the method and apparatus provided according to the present invention separates the total plot error into its component parts, permitting accuracy of the imaging system itself to be isolated and firmly established.

Referring now to FIG. 2, there is illustrated a calibration plot 36 used in calibrating the system of FIG. 1. The substrate comprises a conventional graphics art film, such as Kodak Estar Base film. Dimensional stability of a substrate is related to the magnitude of the change in size induced by changes of environmental humidity and temperature, as well as by substrate processing. These changes in dimension can either be reversible or irreversible. When the relative humidity of the air surrounding photographic film is raised, the film becomes larger and, conversely, as the humidity drops, the film shrinks. Dimensional variations caused by change in relative humidity are reversible. At the time of inspection the film must be in an environment with the same relative humidity as at the time of exposure, and must be in that environment long enough to equilibrate.

The substrate film changes size not only with humidity but also with temperature. As with humidity, higher film temperatures result in slightly larger films. Therefore, the film must be at the same temperature both during exposure and during the time of inspection. For example, a Kodak film with a thermal coefficient of 0.001%, will exhibit a size change over 5° F. of 0.0013 inches over 26 inches.

An example of irreversible dimensional changes are those which occur during chemical processing. Some substrate films, such as cellulose-acetate based films, exhibit shrinkage due to removal of residual solvent during processing. These films, as well as resin based films, also undergo irreversible dimensional changes as a result of the mechanically induced stress of automated film processing and the interplay of the film based material and emulsion gels under those stresses. Also, typical film processing will expose the film to a wet environment (100% relative humidity), promoting moisture induced expansion. If the film is dried at too high a temperature the film will be temporarily oversized as it completes processing.

Those skilled in the art will note that a film substrate will require a finite time to stabilize with each new set of temperature and humidity conditions. The time necessary for a film substrate to reach moisture equilibrium is a function of the thickness of the film. A 0.004 inch (4 mil) thick Kodak LPF film will require approximately four hours to reach 95% of equilibrium, while a 0.007 inch (7 mil) thick LPF film will need approximately 8 hours to achieve the same percent of equilibrium. After processing and before inspection, the film must be allowed to stabilize. The length of time required for film stabilization is a function of the amount of moisture absorbed during processing, which is correspondingly a function of the time of film exposure to high humidity. Consequently, films washed for a long period of time during processing will take a correspondingly longer period of time to stabilize to room condition after the film has dried. Although only the processing induced dimensional changes for film substrates have been detailed, those skilled in the art will note that similar dimensional changes will be generated when processing other substrates, such as those of film emulsion on a base of glass.

After the substrate has been conditioned it is placed emulsion side up on the write platen. Two calibrated glass scales 38 and 40 (FIG. 2) are placed etched side down along adjacent perpendicular edges of the substrate. The system is programmed to expose the substrate with a series of registration marks, such as marks 42 and 44 which comprise cross lines on half-inch centers. The marks cover the entire substrate surface, with the exception of the regions directly under the scales. The system is configured to saturate the scale region with light, resulting in a contact image of each scale being produced on the film. After the film has been processed in the manner described hereinabove, the humidity and temperature of the calibration environment is selected to be the same as when the substrate was exposed to ensure dimensional consistency during the measurement procedures.

With a calibration substrate exposed as described hereinabove, it is possible to determine not only the overall error, but also the constituent mechanical error introduced from the system as well as through processing.

After processing, the exposed substrate is positioned on a conventional validating apparatus such as a Validator marketed by the Brown and Sharp Co., where the length of each glass scale image is measured. To correct for maximum Validator and scale induced error, a value for maximum Validator and scale induced error is subtracted from the measurement of each axis.

TABLE 1

| X axis, Scale (Validator Axis A) | | Y axis, Scale (Validator Axis B) |
|---|---|---|
| 24.5010 | length measured by Validator | 17.5014 |
| (0.0005) | Validator axis calibration value | (0.0002) |
| (0.0003) | glass scale calibration value | (0.0002) |
| 24.5002 | Corrected scale measurement value | 17.5010 |

The difference between the corrected scale measurement value and the graduations on the scales themselves recorded on the substrate are then due to environmental and processing conditions, since the scales were contact printed on the film. In the example above, the 0.0002 inch difference between the length of the X scale (24.5000 inch and the 24.50002 correct scale measurement), i.e. the measurement of the scale image on the film, results from processing related film growth.

Next, the separation between registration marks positioned at a distant end of the scales (marks 42 and 44) are measured from an origin 46. These values are adjusted by the corresponding Validator axis calibration number.

TABLE 2

| X axis (Validator Axis A) | | Y axis (Validator Axis B) |
|---|---|---|
| 24.5015 | Registration mark separation | 17.5007 |
| (0.0005) | Validator axis calibration value | (0.0002) |
| 24.5010 | Corrected Plot Measurement value | 17.5005 |

The corrected plot measurement value is corrected for Validator induced errors only, and measures the actual distance between two specific target marks on the film at that point in time. This is because film dimensions and, therefore, dimensions of the images on the film, change as a function of time and change as a function of the relative humidity and temperature. The mechanical plotter error per axis then is the worst case difference between the corrected scale measurement and the corrected plot measure for all points along each axis.

TABLE 3

| X axis Scale #1 | | Y axis Scale #2 |
|---|---|---|
| 24.5002 | Corrected Scale Measurement value | 17.5010 |
| 24.5010 | Corrected Plot Measurement value | 17.5005 |
| 0.0008 | Calculated System Accuracy | 0.0005 |

This "calculated system accuracy" is the resultant accuracy as determined from the film measurements corrected for the effect of environmental and processing conditions and is, therefore, the accuracy of the imaging system 10 itself, independent of the metrology equipment accuracy, environmental and processing conditions.

Similarly, although the invention has been shown and described with respect to a preferred embodiment thereof, those skilled in the art will not that various other changes, omissions, and additions thereto may be made therein without departing from the spirit and scope of the invention.

We claim:

1. A method for determining the dimensional accuracy of artwork created in a light-sensitive substrate capable of dimensional variation in at least one direction, the artwork output from a direct optical imaging system, said method comprising the steps of:
   generating a calibration substrate, including
   positioning transparent glass scales on perpendicular adjacent edges of a planar substrate extending from an origin thereof;
   exposing the calibration substrate to electromagnetic radiation so as to image the glass scales as well as a plurality of registration marks thereof;
   developing the calibration substrate to fix said scale images and said registration marks therein;
   generating corrected scale measurement values from said glass scale images including the steps of measuring the length of each of said scale images on a validating apparatus having a calibration value for each of said perpendicular edges, and arithmetically combining with each of said measured scale image lengths a corresponding one of said validating apparatus calibration values and a glass scale calibration value;
   generating corrected plot measurement values from said registration marks including the steps of determining separation values between said origin and select ones of said imaged registration marks on said substrate and arithmetically combining with each of said separation values a corresponding one of said validating apparatus calibration values; and
   computing a value of calculated system accuracy from the difference between said corrected scale measurement values and said corrected plot measurement values.

2. The method of claim 1 further comprising the steps of:
   determining values of relative humidity and substrate environmental temperature during said substrate exposure; and
   establishing said values of relative humidity and temperature during said steps of generating corrected scale and corrected plot measurement values.

3. An apparatus for determining the dimensional accuracy of artwork created in a light-sensitive substrate capable of dimensional variation in at least one direction from a direct optical imaging system comprising:
   a plurality of transparent scales for positioning on adjacent perpendicular edges of a planar calibration substrate, said scales to extend from an origin thereon;
   means for exposing said calibration substrate to electromagnetic radiation so as to image said glass scales as well as a plurality of registration mark on said calibration substrate;
   means for developing the calibration substrate to fix said scale images and said registration marks therein; and
   computation means for
   generating a corrected scale measurement value from said glass scale images including a means for measuring the length of each of said scale images on a validating apparatus having a calibration value for each of said perpendicular edges, and arithmetically combining with each of said measured scale image lengths a corresponding one of said validating apparatus calibration values and a glass scale calibration value;
   generating a corrected plot measurement value from registration marks including a means for determining separation values between said origin and select one of said imaged registration marks on said substrate and arithmetically combining with each of said separation values a corresponding ones of said validating apparatus calibration values; and
   determining the value of calculated accuracy from the difference between said corrected scale measurement value and said corrected plot measurement value.

4. The apparatus of claim 3 further comprising:
   a means for determining values of relative humidity and substrate environmental temperature during said substrate exposure; and
   a means for establishing said values of relative humidity and temperature when generating corrected scale and corrected plot measurement values.

* * * * *